United States Patent
Heym (10) Patent No.: US 6,913,283 B2
(45) Date of Patent: Jul. 5, 2005

(54) AIRBAG

(75) Inventor: Axel Heym, Berlin (DE)

(73) Assignee: Takata-Petri AG, Aschaffenburg (DE)

(*) Notice: Subject to any disclaimer, the term of this patent is extended or adjusted under 35 U.S.C. 154(b) by 33 days.

(21) Appl. No.: 10/444,065

(22) Filed: May 23, 2003

(65) Prior Publication Data

US 2003/0230883 A1 Dec. 18, 2003

(30) Foreign Application Priority Data

May 24, 2002 (DE) .......................... 102 24 138

(51) Int. Cl.⁷ .............................................. B60R 21/16
(52) U.S. Cl. .................. 280/732; 280/743.1; 280/743.2
(58) Field of Search ............................ 280/729, 730.1, 280/731, 732, 733, 743.1, 743.2

(56) References Cited

U.S. PATENT DOCUMENTS

| | | | |
|---|---|---|---|
| 4,076,277 A | | 2/1978 | Kuwakado et al. |
| 5,599,041 A | | 2/1997 | Turnbull et al. |
| 5,730,464 A | * | 3/1998 | Hill .......................... 280/743.2 |
| 6,042,147 A | * | 3/2000 | Nishijima et al. ....... 280/743.1 |
| 6,254,121 B1 | * | 7/2001 | Fowler et al. .............. 280/729 |
| 2002/0195802 A1 | | 12/2002 | Kamm et al. |

FOREIGN PATENT DOCUMENTS

| | | |
|---|---|---|
| DE | 38 33 889 A1 | 4/1990 |
| DE | 195 40 911 A1 | 5/1997 |
| DE | 201 02 115 U1 | 8/2001 |
| DE | 100 33 937 A1 | 1/2002 |
| EP | 1 262 377 A2 | 12/2002 |
| GB | 2 309 202 A | 7/1997 |
| JP | 4-201644 A | 7/1992 |
| JP | 4-292239 A | 10/1992 |
| WO | WO 97/06987 A1 | 2/1997 |

* cited by examiner

Primary Examiner—Paul N. Dickson
Assistant Examiner—Toan C To
(74) Attorney, Agent, or Firm—Foley & Lardner LLP

(57) ABSTRACT

A driver or front passenger airbag including a gas bag which can be inflated in a head-on collision to protect a motor vehicle occupant. The gas bag including two sections which are separated from one another so that the inflated gas bag has, on its front side facing the occupant to be protected, a gap which runs between the gas bag sections. The gap is spanned by a sheet so that, in the case of an impact directed toward the front side of the gas bag, the occupant to be protected is prevented by the sheet from penetrating into the gap.

23 Claims, 7 Drawing Sheets

AIRBAG

BACKGROUND OF THE INVENTION

The invention relates to a driver's or front passenger's airbag for motor vehicles.

An airbag of this type is used for protecting a motor vehicle occupant in a "head-on crash", in which a vehicle collides head on with an obstacle, in particular is used for avoiding a collision of one of the front vehicle occupants with the windshield, the steering wheel or the dashboard. The gas bag of a generic driver's or front passenger's airbag has at least two gas bag sections which are separated from each other so that the gas bag, which is inflated by means of a gas generator, is provided, on its front side facing the occupant to be protected, with a gap running between the gas bag sections, and the gas bag sections are connected to one another exclusively on the rear side facing away from the occupant to be protected.

DE 100 33 937 A1 (incorporated by reference herein) discloses a gas bag for an occupant protection device in motor vehicles, which can be inflated by means of a gas generator and, when inflated, the outer covering of which forms a gap on its covering surface assigned to the occupant to be protected. The occupant to be protected may penetrate into the gap with a body part which faces the gas bag. If the occupant is out of position ("OOP") during inflation of the airbag, the gap is expanded in order to reduce the collision of the occupant with the assigned covering surface of the gas bag. In addition, means, for example in the form of a sheet or sheet-like element, may be provided in order to brace the gas bag sections, which are separated from one another by the gap, relative to one another, so that after inflation the gas bag forms the same protection for an occupant in a normal position as a gas bag without a gap. However, it is ensured here by means of the arrangement and design of the sheet or sheet-like element that an occupant who is outside his/her normal sitting position and is bent forward toward the airbag module (corresponding to the "out of position situation") may penetrate into the gas bag gap during inflation of the gas bag.

DE 201 02 115 U1 (incorporated by reference herein) discloses an "annular airbag" for a driver's or front passenger's airbag module, which has a chamber that is to be inflated annularly and which surrounds an inner indentation facing the occupant to be protected. With gas bags of this type, the intention is to obtain better restraint values if the occupant is out of position, by the fact that the front side of the gas bag that faces the occupant is accelerated less severely than in the case of gas bags without an annular chamber and, by this means the risk of the occupant being injured as a consequence of colliding with the unfolding gas bag is reduced. In this case, a closure part is fastened to the gas bag wall so that, when the gas bag is inflated, said closure part slides in front of the mouth of the indentation and thereby closes the indentation. As a result, the vehicle occupant to be protected cannot penetrate into the indentation.

The disadvantage of the known gas bags for an airbag module is that in spite of the reduced mechanical load on the occupant to be protected, said gas bags may, if the occupant is out of position, lead to a thermal load on the occupant to be protected if said occupant comes into contact with hot fabric parts of the gas bag, i.e. with fabric parts of the gas bag covering which have been heated by the hot gases used for inflation of the gas bag.

SUMMARY OF THE INVENTION

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIGS. 1d–1g show different views of the gas bag from FIG. 1a.

FIG. 5b shows a front plan view of the gas bag according to the gas bag arrangement from FIG. 5a.

FIG. 6b is a front plan view of the gas bag of the gas bag arrangement from FIG. 6a.

FIG. 7b is a front plan view of the gas bag of the gas bag arrangement from FIG. 7a.

DETAILED DESCRIPTION

As mentioned above, an exemplary embodiment of the present invention includes an airbag for protecting an occupant seated in the front row of the vehicle. The airbag is conFig.d to be inflated in a head-on collision to protect the motor vehicle occupant. The airbag includes two gas bag sections which are separated from one another so that the inflated gas bag has, on its front side facing the occupant to be protected, a gap which runs between the gas bag sections. The gap is spanned by a sheet or sheet-like element so that, in the case of an impact directed toward the front side of the gas bag, the occupant to be protected is intercepted by the sheet or sheet-like element.

As a result, a body part of the occupant may penetrate into the gap for a certain distance; but the occupant is not permitted to completely penetrate into the gap past the sheet or sheet-like element. The airbag and sheet or sheet-like element provides for the restraining action for protecting a vehicle occupant to be essentially taken on by the sheet or sheet-like element and, as a result, the two inflatable gas bag sections are used essentially only for the purpose of tightening the sheet or sheet-like element. As a result, the restraining action required for protecting the vehicle occupant is achieved with the occupant coming into contact with the covering of the gas bag and not with portions of the gas bag which are possibly hot.

According to one exemplary embodiment of the invention, the sheet or sheet-like element extends here directly in front of the front end of the gas bag, which faces the upper body and the head of the occupant to be protected, i.e. directly along the front side of the gas bag, so that the gap—as seen from the head and upper body of the occupant to be protected—is completely covered by the sheet or sheet-like element. According to another embodiment of the invention, the sheet or sheet-like element is offset slightly to the rear, toward the rear side of the gas bag, which side faces away from the head and upper body of the vehicle occupant, relative to the front end (of the front side) of the gas bag, which end faces the head and upper body of the vehicle occupant to be protected, so that part of the gap formed between the gas bag sections—as seen from the head and upper body of the vehicle occupant—runs in front of the sheet or sheet-like element. The vehicle occupant, prior to impacting against the sheet or sheet-like element, initially penetrates for a certain distance into that region of the gap between the two gas bag sections which is not covered by the sheet or sheet-like element before the occupant is intercepted by the sheet or sheet-like element.

The sheet or sheet-like element may be fastened at least one point to each of the gas bag sections separated from one another by means of the gap, and in this case preferably has at least three fastening points in total. The effect achieved by this is that the sheet or sheet-like element is fastened nondisplaceably to the gas bag.

During inflation of the gas bag the sheet or sheet-like element is tightened, so that it can deploy the required restraining action, and, at the same time, the gas bag sections separated from one another by means of the gap are braced relative to one another.

It should be taken into consideration here that the bracing of the gas bag sections at the points at which the two gas bag sections come into contact causes contact forces which have the tendency to push the gas bag sections apart again. This is counteracted, however, by the sheet or sheet-like element, in which case the contact forces additionally contribute to tightening the sheet or sheet-like element.

The sheet or sheet-like element spans the gap so that, in the case of an impact directed toward the front side of the gas bag (and specifically also if the occupant is "out of position"), the occupant is intercepted by the sheet or sheet-like element, i.e. the sheet or sheet-like element is used as an actual restraining element. The occupant is accordingly preferably intercepted and held back by a region of the sheet or sheet-like element, behind which at least part of the gap runs, with the result that direct contact of the occupant with the gas bag covering is avoided as much as possible.

The gas bag sections are preferably designed and arranged so that during inflation of the gas bag said gas bag sections are in each case unfolded—as seen by the occupant to be protected—in a direction pointing next to the upper body of the occupant to be protected, so that the gap in the inflated gas bag extends essentially in the longitudinal direction of the upper body of the occupant to be protected, i.e. parallel to the spinal column of the corresponding occupant.

According to exemplary embodiments of the present invention, the sheet or sheet-like element itself may be designed, on the one hand, in a membrane-like manner, for example as a fabric part, or, on the other hand, as a net.

In order to fasten the sheet or sheet-like element to the gas bag, seams may be used that also are used for connecting different parts of the gas bag covering, for example a lower panel and upper panel of the gas bag covering.

According to one embodiment of the invention, the gas bag has precisely two gas bag sections which are separated from each other by means of the gap and when inflated are arranged in an essentially V-shaped manner in cross section. According to another embodiment of the invention, more than two gas bag sections are provided which when inflated are arranged essentially in a star-shaped manner.

FIGS. 1a and 1d to 1g illustrate a gas bag 1, the gas bag covering 10 of which has two gas bag sections 11, 12 which are connected integrally to each other on the rear side R of the gas bag 1. The two gas bag sections 11, 12 are fluidly connected by means of a channel 13. On the front side V of the gas bag 1, the two sections 11, 12 form a gap which is spanned by a sheet or sheet-like element 2 in the form of a membrane or a fabric part. The two gas bag sections 11, 12 are completely separated from each other on the front side V of the gas bag 1, i.e. the gap 15 extends through the entire gas bag, so that the two gas bag sections 11, 12 could be pivoted with respect to each other about the connecting channel 13 if they were not held together by the sheet-like element 2. The sheet-like element 2 is sewn along its outer edge 20 to each of the two gas bag sections 11, 12, specifically so that, when the gas bag 1 is inflated, the sheet-like element 2 is tightened and, at the same time, the two gas bag sections 11, 12, which form a V in cross section, are braced relative to each other.

Figure 1A:
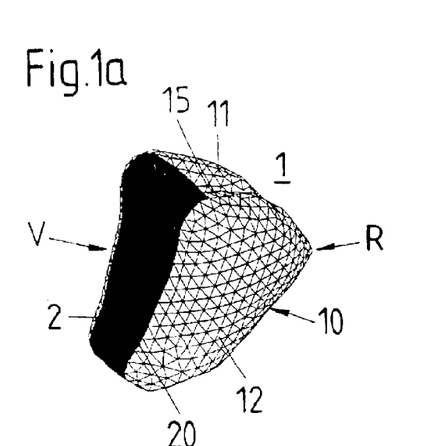
FIG. 1a shows a perspective illustration of a gas bag which comprises two gas bag sections and, on its front side, has a gap spanned by a sheet or sheet-like element.
Figure 1B:
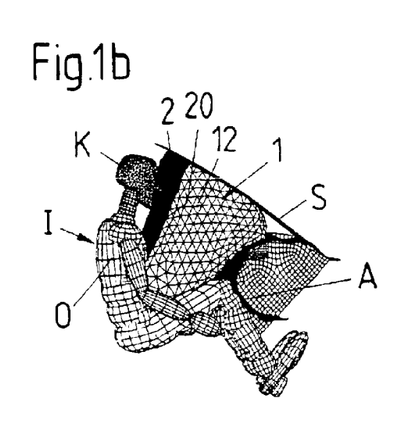
FIG. 1b shows the gas bag from FIG. 1a, installed in a motor vehicle.

FIG. 1b shows the gas bag from FIG. 1a when inflated in a motor vehicle. The gas bag here is part of the front driver's airbag module arranged within the dashboard A of the motor vehicle, and when inflated extends between the dashboard A, the windshield S and the occupant I to be protected. The rear side R of the gas bag is fastened to the dashboard A together with the other parts of the airbag module, namely a gas generator for inflating the gas bag and a module housing for accommodating the gas bag and gas generator. The front side V of the gas bag faces the upper body O and the head K of the occupant I to be protected, specifically so that, in order to obtain the desired restraining action, the occupant I to be protected strikes with his/her head K and his/her upper body O against the sheet-like element 2, as illustrated with reference to FIG. 1c which shows the impact of the vehicle occupant I with his/her head K and his/her upper body O against the airbag comprising the gas bag 1 and the sheet-like element 2. The gap 15 extends between the two gas bag sections 11, 12 behind that region of the sheet-like element 2 against which the vehicle occupant I strikes with his/her head K and his/her upper body O, so that direct collision of the head K and upper body O of the vehicle occupant I with the covering 10 of the gas bag 1 is avoided as much as possible. In addition, the depicted configuration makes self-centering of the head K and upper body O of the occupant I possible in the event of an eccentric impact against the sheet-like element 2.

Figure 1C:
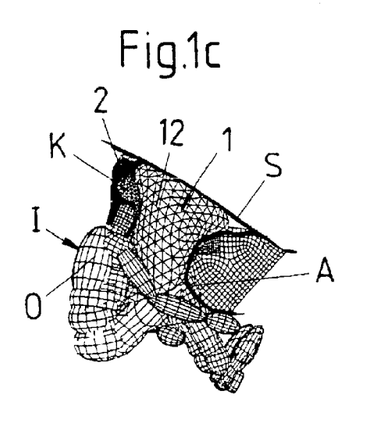
FIG. 1c shows the arrangement from FIG. 1b as a vehicle occupant to be protected plunges into it.
Figure 1D:
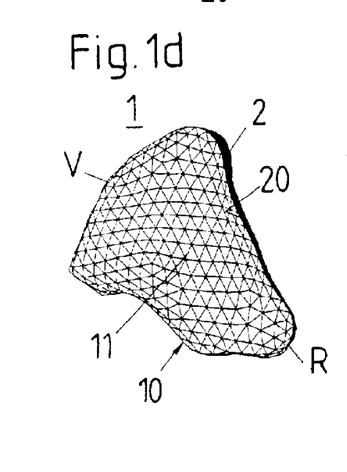
Figure 1E:
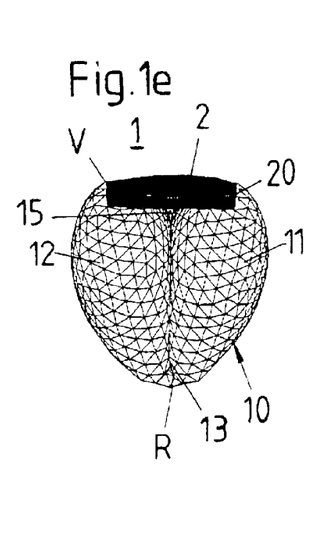
Figure 1F:
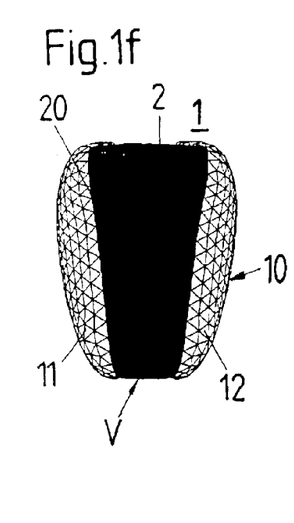
Figure 1G:
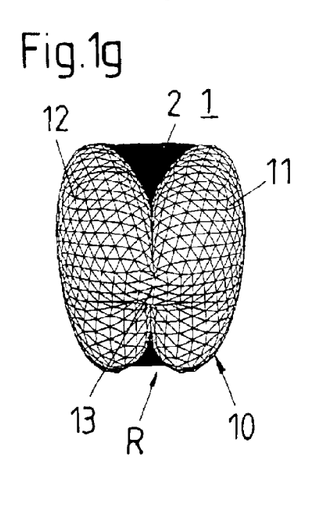

When inflated, the gas bag 1 tightens the sheet-like element 2, so that it can deploy the desired restraining action. At the same time, the gas bag sections 11, 12 are sufficiently flexible because the gas used for inflating the gas bag 1 is let out again directly after the gas bag 1 has unfolded, with the result that the sheet-like element 2 even when tightened is still sufficiently deformable during the impact of the vehicle occupant I in order to avoid injuries to the vehicle occupant I which could occur if the sheet-like element 2 is clamped too rigidly in place.

Figure 2A:
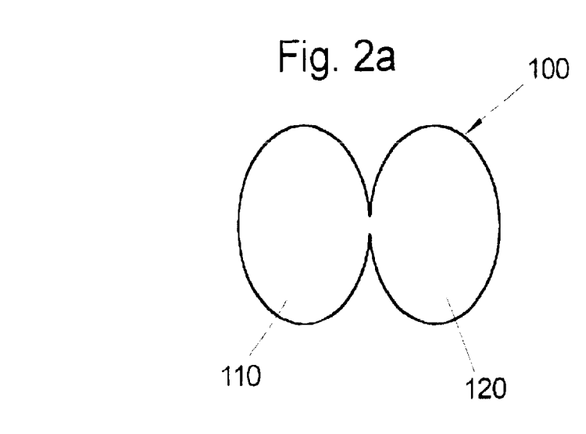
FIG. 2a shows a schematic illustration of the lower panel of a gas bag which consists of two gas bag sections and, in its front side, forms a gap.

FIG. 2a shows a fabric part 100 forming the upper and lower panels of a gas bag 1 of the type illustrated in FIGS. 1a to 1g. The covering of the gas bag 1 comprises two identical fabric parts 100 according to FIG. 2a connected to each other along a seam. Each of the two fabric parts 100 forming the upper and lower panels has in each case two elliptical sections 110, 120 which are connected integrally to each other, so that a gas bag 1 having two gas bag sections 11, 12 in accordance with FIGS. 1a to 1g can be formed from the fabric parts.

Figure 2B:
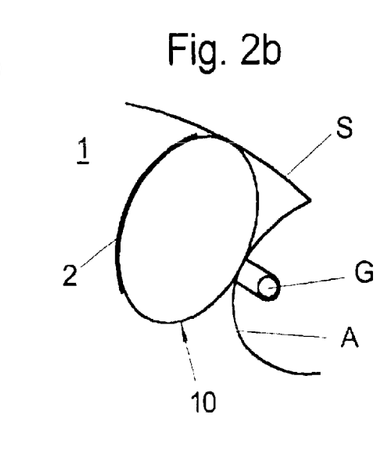
FIG. 2b shows a gas bag corresponding to FIG. 2a when inflated within a motor vehicle.

FIG. 2b shows, in a schematic side view, a gas bag 1, comprising two fabric parts 100 according to FIG. 2a, when inflated in a motor vehicle, the gas bag 1 being part of a front passenger's airbag module arranged in the dashboard of the motor vehicle and being inflatable by a gas generator G which is arranged in the dashboard. When inflated the gas bag 1 extends, as seen by the vehicle occupant (front passenger) to be protected, in front of the dashboard A and below the windshield S.

Figure 2C:
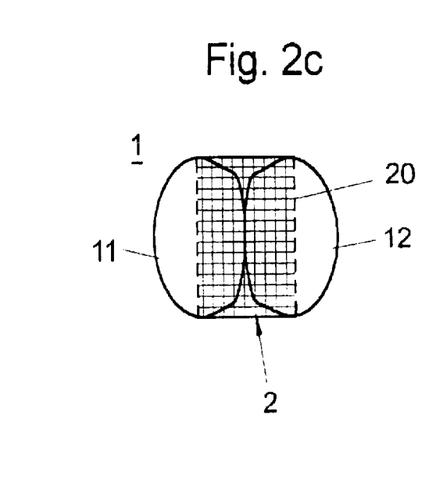
FIG. 2c shows a front view of a gas bag according to FIG. 2a with a sheet or sheet-like element spanning the gap.

FIG. 2c shows a front view of an inflated gas bag comprising the two fabric parts 100 according to FIG. 2a, the two gas bag sections 11, 12 being separated from each other on the front side of the gas bag that faces the occupant to be protected by means of a gap which is completely covered by a sheet-like element 2, and the sheet-like element 2 being sewn along its edge 20 to each of the gas bag sections 11, 12.

Figure 2D:
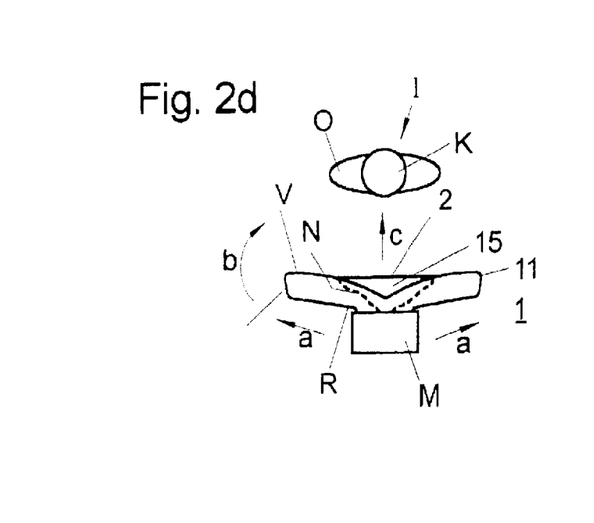
FIG. 2d shows a gas bag corresponding to FIG. 2a as it unfolds from a module housing.

FIG. 2d shows the gas bag 1 as it unfolds out of the module housing M of a front passenger's airbag module by being inflated. It can be seen that the two gas bag sections 11, 12 initially move at the beginning of the unfolding process outward in a direction "a" and next to the upper body O of the occupant I to be protected before, during further inflation, a movement takes place in a direction b toward the upper body O and the head K of the occupant to be protected. The two gas bag sections 11, 12, which are separated from each other on the front side V of the gas bag 1 by means of a gap 15, remain here, as is clear with reference to the side view of the completely inflated gas bag in FIG. 2e, essentially in the lateral edge region of the upper body O of the vehicle occupant I to be protected. The central region of the upper body O (central chest and stomach region and also head K) is assigned the sheet-like element 2 which, on inflation, moves head-on in a direction c toward the occupant to be protected and which is tightened by the two gas bag sections 11, 12.

Figure 2E:
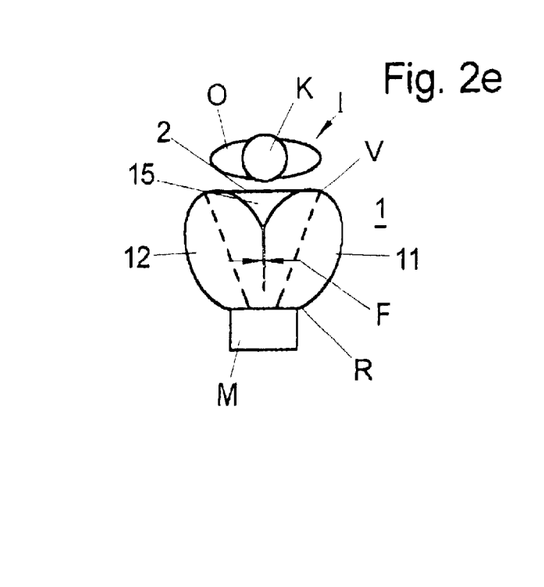
FIG. 2e shows the gas bag from FIG. 2d after it has completely unfolded.

FIG. 2e furthermore indicates the contact forces F which occur when the two gas bag sections 11, 12 come into contact in the region of the gap 15 as the gas bag unfolds. The forces F have the effect of pressing the gas bag sections 11, 12 apart, and lead to tightening of the sheet-like element 2. The tension occurring in the sheet-like element 2 is influenced by the size of that region of the sheet-like element 2, which spans the gap 15. The shorter the distance between the fastening points of the sheet-like element 2 on both sides of the gap 15, the greater is the tension that occurs in the sheet-like element. This is caused by the contact forces, which increase at a shorter distance, at the contact faces between the gas bag sections 11, 12. If that region of the sheet-like element 2 which spans the gap 15 is of a relatively large size (corresponding to a greater distance between the fastening points of the sheet-like element 2 on both sides of the gap 15 and therefore to a relatively large width of the gap 15), not only does lower tension occur, but the gas bag sections 11, 12 unfold laterally outward to a more pronounced extent. The size of the sheet-like element 2 therefore also controls the arrangement of the gas bag sections 11, 12 of the completely inflated gas bag.

Figure 3A:
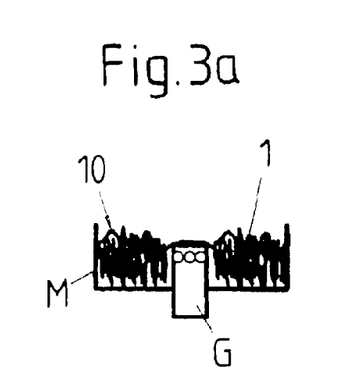
FIG. 3a shows a schematic illustration of a folded gas bag which is arranged within a module housing and has two gas bag sections, which are separated from each other by means of a gap, and a sheet or sheet-like element for spanning the gap.

FIG. 3a shows, in greater detail, the gas bag 1 from FIGS. 1a to 2e, which is arranged within a module housing M of a front passenger's airbag module, the folded gas bag 1 surrounding a gas generator G.

Figure 3B:
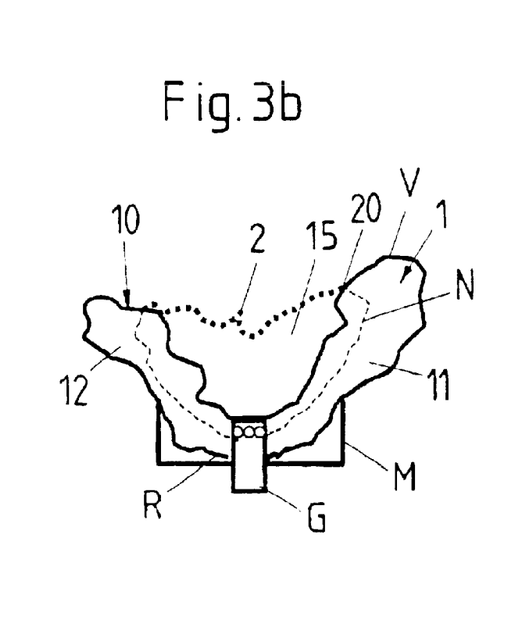
FIG. 3b shows the gas bag from FIG. 3a as it unfolds.

FIG. 3b shows in greater detail the beginning of the unfolding process of the gas bag 1 out of the module housing M as the gas bag is being inflated by means of a gas generator G, corresponding to the schematic illustration from FIG. 2d. Reference is made to the details in FIG. 2d for explanation. It can also be seen that, in order to fasten the sheet-like element 2 to the gas bag sections 11, 12, use is made of the seam N that is used for connecting the two fabric parts (cf. FIG. 2a) of which the covering of the gas bag 1 consists.

Figure 3C:
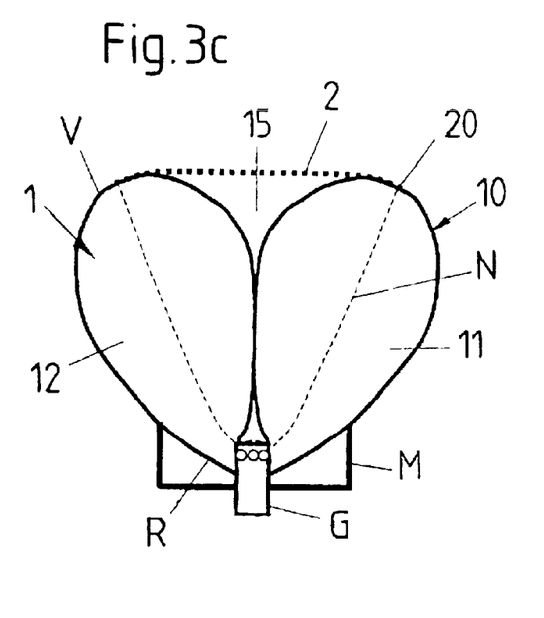
FIG. 3c shows the gas bag from FIGS. 3a and 3b when unfolded.

FIG. 3c shows in greater detail an illustration of the gas bag which has been completely inflated by means of the gas generator G and is completely unfolded out of the module housing M, corresponding to the schematic illustration in FIG. 2e, to the explanation of which reference is made for further details.

In particular, it can be seen with reference to FIGS. 3b and 3c that during the entire unfolding process of the gas bag 1 the gap 15, which is formed between the two gas bag sections 11, 12 on the front side V of the gas bag 1, is always covered by the sheet-like element 2.

Figure 4A:
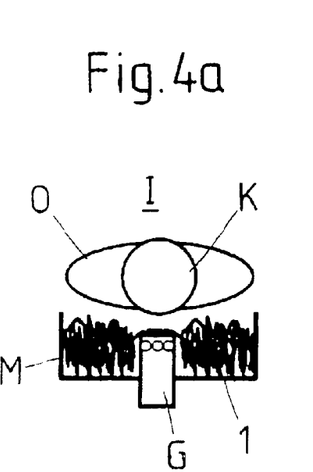
FIG. 4a shows an illustration corresponding to FIG. 3a, with the vehicle occupant to be protected additionally being shown out of position.

FIG. 4a discloses the gas bag 1, which is folded in a module housing M, corresponding to FIG. 3a, but with a vehicle occupant I being situated with his/her upper body O and his/her head K very tightly in front of the module housing M. This corresponds to the occupant being "out of position" where the vehicle occupant is bent over forward out of his/her normal sitting position in the direction of the airbag module.

Figure 4B:
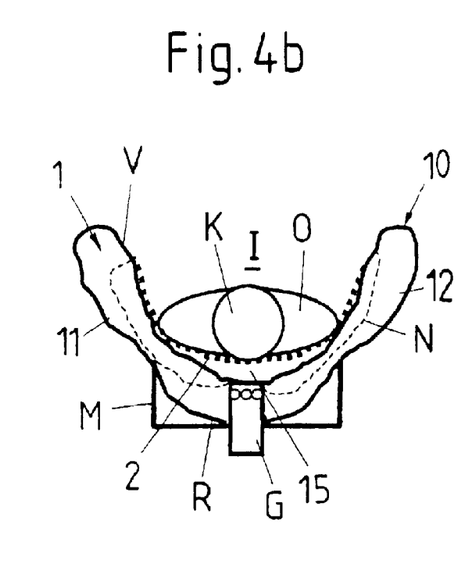
FIG. 4b shows an illustration corresponding to FIG. 3b, in which the unfolding of the gas bag is influenced by a vehicle occupant who is out of position.
Figure 4C:
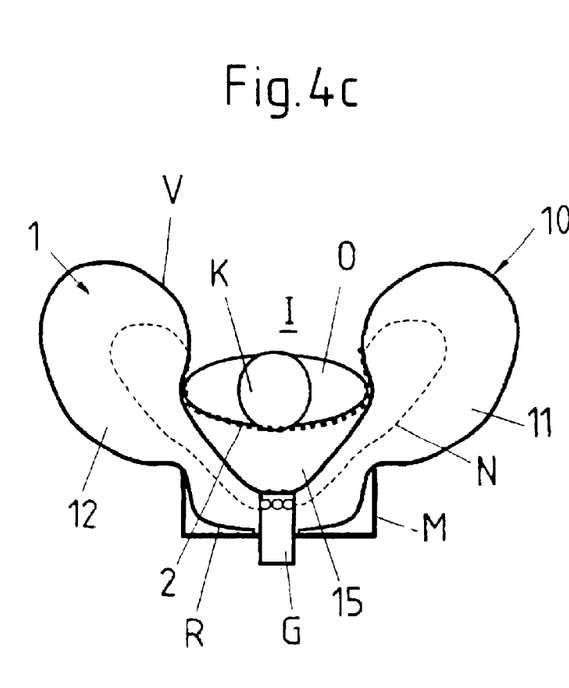
FIG. 4c shows an illustration corresponding to FIG. 3c with a vehicle occupant who is out of position.

FIGS. 4b and 4c show the gas bag 1 at the beginning of the unfolding process and when completely inflated, corresponding to the illustration in FIGS. 3b and 3c, but with the vehicle occupant 1, who is bent over forward in the direction of the airbag module, influencing the unfolding process of the gas bag 1. It is clear from FIGS. 4b and 4c that because the vehicle occupant I has plunged at an early point into the region between the two gas bag sections 11, 12, the two gas bag sections 11, 12 unfold essentially laterally next to the upper body O and the head K of the vehicle occupant I to be protected, thus preventing the vehicle occupant I from being directly hit if he/she is out of position.

As in the situation in which the vehicle occupant I to be protected is in a normal sitting position, the restraining function in respect of the vehicle occupant I is also taken on here by the sheet-like element 2 which is fastened at its edge 20 to the two gas bag sections 11, 12 and covers the gap 15 between the two gas bag sections 11, 12. The penetration of the vehicle occupant I to be protected into the region between the two gas bag sections 11, 12 at an early point when the occupant is out of position has the effect of displacing the sheet-like element 2, compared with the airbag being triggered with an occupant in a normal position, a short distance further in the direction of the rear side R of the gas bag 1, with the result that the occupant I can penetrate with his/her upper body O a short distance further into the gap 15. However, complete penetration of the occupant I with his/her upper body O into the gap 15 is prevented by the sheet-like element 2.

For an OOP situation, the present invention provides an airbag that avoids head-on impact of the occupant I with the gas bag sections 11, 12. Instead, the occupant I is intercepted by the sheet-like element 2, which moves comparatively slowly toward the occupant I, with the result that the risk of injury to the occupant I is considerably reduced.

Figure 5A:
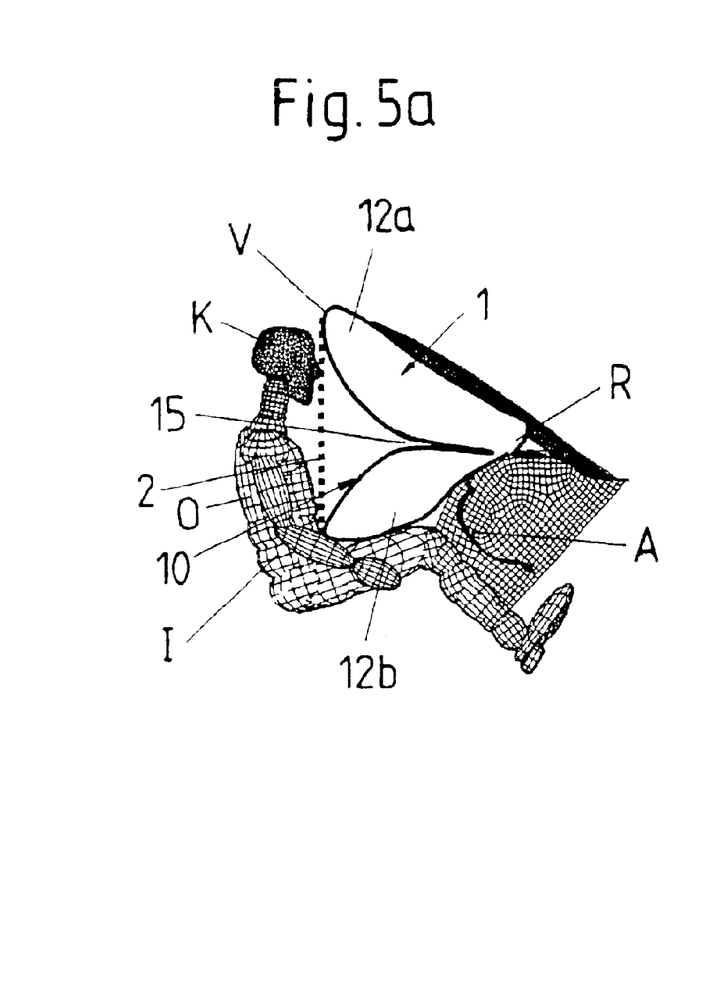
FIG. 5a is a side view of another embodiment of a gas bag according to the present invention.
Figure 5B:
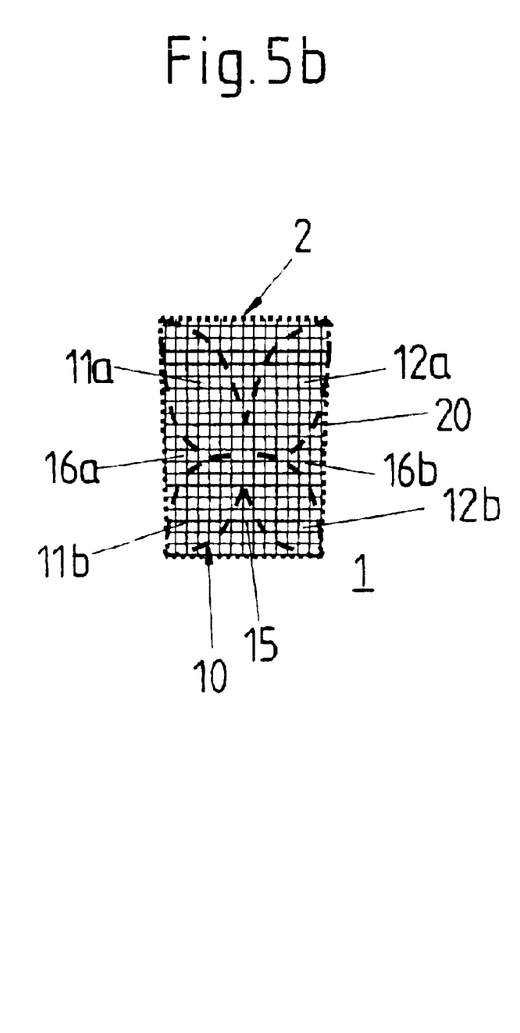

FIGS. 5a and 5b discloses an alternative embodiment of a gas bag 1, in which the two lateral gas bag sections 11a, 11b, on the one hand, and 12a, 12b, on the other hand, are in each case divided into two subsections 11a and 11b and 12a and 12b, with the result that the gas bag has, in a front view according to FIG. 5b, an essentially star-shaped contour, and in which next to the slit 15 which separates the two gas bag sections 11a, 11b, on the one hand, and 12a, 12b, on the other hand, from one another, two additional gaps 16a, 16b are formed which respectively separate the subsections 11a, 11b and 12a, 12b from each other.

Furthermore, in the exemplary embodiment shown in FIGS. 5a and 5b, the sheet-like element 2 is designed as a net. In other respects, the embodiment shown in FIGS. 5a–5b corresponds in its function to the exemplary embodiment explained with reference to FIGS. 1a to 4c.

Figure 6A:
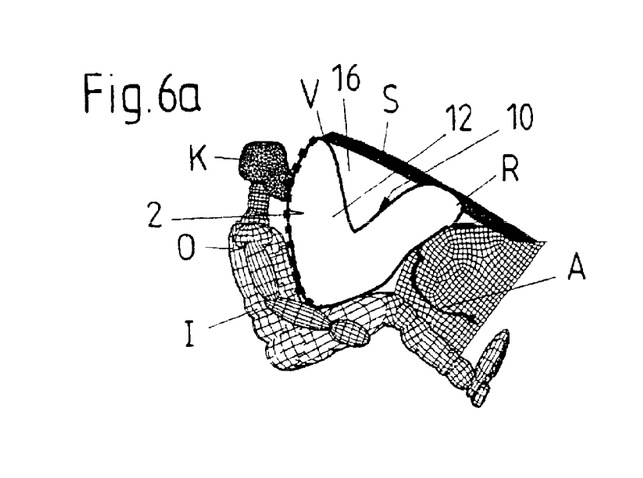
FIG. 6a is a side view of alternative embodiment of a gas bag according to the present invention.
Figure 6B:
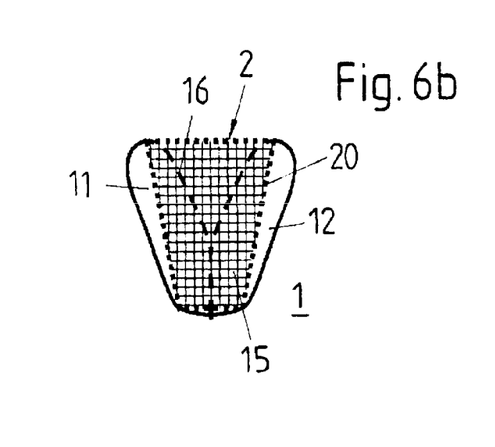

FIGS. 6a and 6b show an exemplary embodiment of a gas bag 1, in which, in contrast to the exemplary embodiment according to FIGS. 1a to 4c, the two gas, bag sections 11, 12 are not only separated from each other by means of a gap 15 covered by the sheet-like element 2, but, moreover, also have a indentation 16 on their upper side but below the windshield S of a motor vehicle.

Figure 7A:
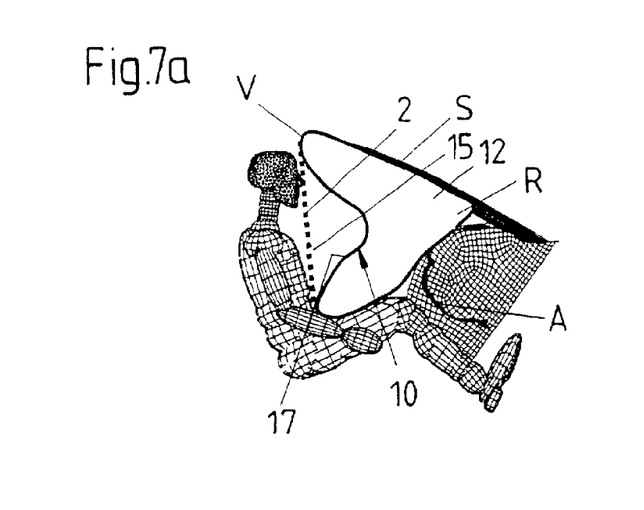
FIG. 7a is a side view of yet another alternative embodiment of a gas bag according to the present invention.
Figure 7B:
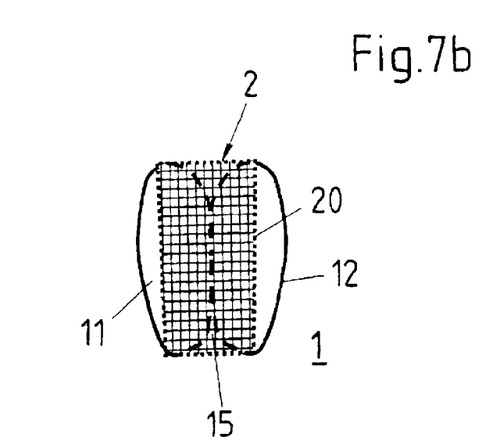

In the exemplary embodiment according to FIGS. 7a and 7b, the two gas bag sections 11, 12 additionally have an indentation 17 on their front side, i.e. a depression that extends toward the rear side R of the gas bag 1.

In the case of the exemplary embodiments shown in FIGS. 5a and 5b, 6a and 6b and 7a and 7b, a reduction in the working volume of the gas bag 1 is achieved in each case by the additional cavity 16a, 16b; 16 and 17 formed by the cut of the respective gas bag 1. As a result, a correspondingly smaller amount of gas is required for inflating the gas bag and a smaller, lighter gas generator can be used for this.

Thus, as a result, in the case of the exemplary embodiments according to FIGS. 5a and 5b, 6a and 6b and 7a and 7b, specific adaptation of the cut of the gas bag covering to the space available within the vehicle, in particular between the dashboard, window and occupant, has the effect of achieving optimum protection of the occupant with the required amount of gas being as small as possible.

Figure 8:
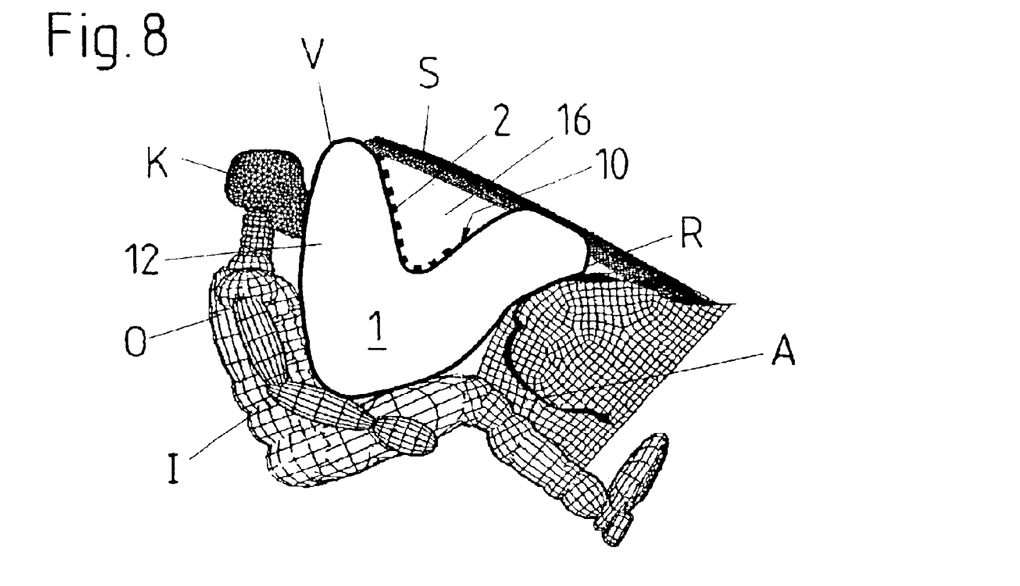
FIG. 8 is a side view of still another alternative embodiment of a gas bag according to the present invention.

FIG. 8 shows a modification of the exemplary embodiment from FIGS. 6a and 6b, in which the sheet-like element 2 does not extend directly on the front side V of the gas bag 1 and thus does not completely cover the gap (15), seen from the head K of the vehicle occupant I, formed between the two gas bag sections 11, 12. Rather, the sheet-like element 2 extends from the front side V of the gas bag 1 into a transition region between the front side V and the rear side R of the gas bag 1, so that a region of the gap formed between the gas bag sections 11, 12, which region faces the head K and upper body O, is not covered by the sheet-like element 2. Accordingly, in the event of a crash the vehicle occupant I enters with his/her head K and his/her upper body O initially a certain distance into the region between the two gas bag sections 11, 12 (cf. FIG. 6b) on the front side V of the gas bag arrangement before he/she is intercepted by the sheet-like element 2 spanning the gap between these two gas bag sections. The described arrangement of the sheet-like element 2 is made possible; in particular, by the additional indentation 16 of the gas bag 1, which indentation is partially bounded by the sheet-like element 2.

As a result, the gas bag arrangement illustrated in FIG. 8 is therefore distinguished by the sheet-like element 2 on the front side V of the gas bag 1 not running directly at its front end which faces the head K and upper body O of the vehicle occupant I, but rather being offset relative to this front end by a certain distance toward the rear side R of the gas bag 1. The sheet-like element 2 thereby spans only those regions of the gap formed between the gas bag sections that—as seen from the head K and upper body O of the vehicle occupant I—lie behind the sheet-like element 2. Accordingly, in a crash-induced movement toward the front side V of the gas bag 1, the vehicle occupant I enters with his/her head K and upper body O first of all into those regions of said gap that lie in front of the sheet-like element 2 before said occupant is intercepted by the sheet-like element 2.

Figure 9:
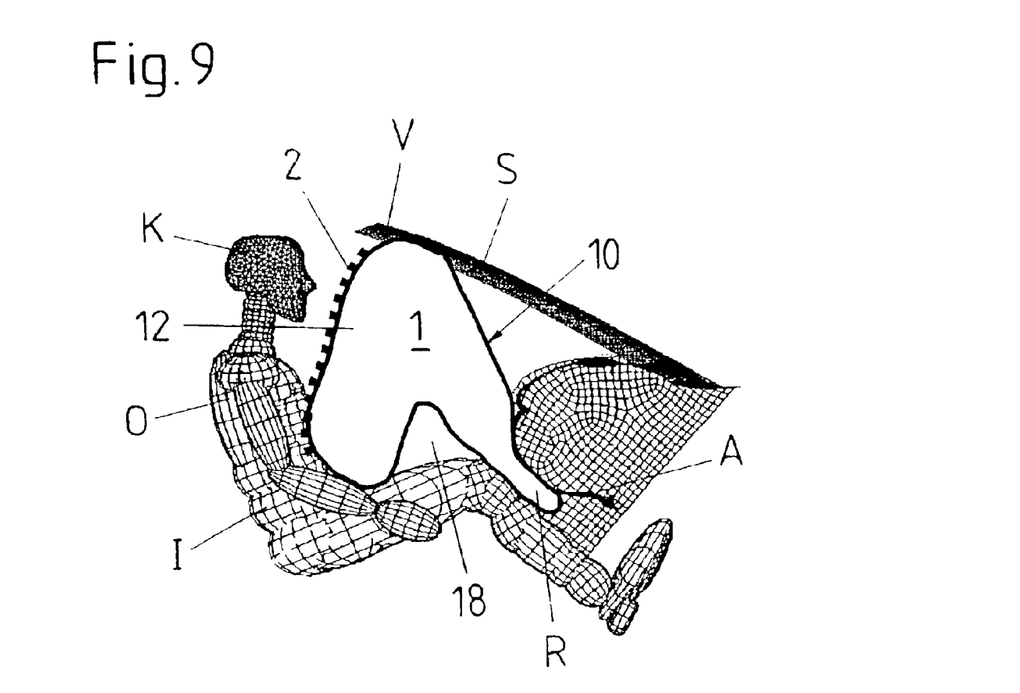
FIG. 9 is a view of an alternative embodiment of a gas bag according to the present invention.

FIG. 9 shows a further modification of the gas bag arrangement from FIGS. 6a and 6b, one difference being that the additional indentation 18 of the gas bag 1 faces the knee and thigh region of the occupant I to be protected (and not the windshield S of the vehicle as in FIG. 6a). The gas bag 1 shown in FIG. 9 is configured so that the rear end of the gas bag 1 is fastened to the lower region of the dashboard A of a motor vehicle. As a result, the gas bag 1 forms, in the region of its rear end, knee protection for the vehicle occupant I. Thus, the gas bag includes a section which is used as a restraining element for the knees of the vehicle occupant in the event of a crash.

The priority application, German Patent Application DE 102 24 138.4-42, filed May 24, 2002, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag for protecting an occupant located in a front seat of a vehicle, the airbag comprising:
   a gas bag configured to be inflated in a head-on collision to protect the occupant, the gas bag including two gas bag sections that separate when the gas bag inflates to form a gap on a front side of the gas bag facing the occupant, the two gas bag sections being completely separated from each other on the front side of the inflated gas bag; and
   a sheet spanning the gap so that, in the case of an impact directed toward the front side of the gas bag, the occupant to be protected is intercepted by the sheets,
   wherein the gas bag is configured so that when the gas bag initially inflates, the two gas bag sections are separated by the gap, and when the gas bag further inflates, the two gas bag sections are in contact on at least one contact surface in the region of the gap, and so that on the contact surface contact forces occur which have the tendency to press the two gas bag sections apart.

2. The airbag of claim 1, wherein the sheet extends over the front side of the gas bag.

3. The airbag of claim 1, wherein the sheet extends over a transition region between the front side of the gas bag and the rear side of the gas bag.

4. The airbag of claim 1, wherein the sheet is positioned spaced apart from a rear side of the gas bag.

5. The airbag of claim 1, wherein the sheet is fastened to each of the gas bag sections.

6. The airbag of claim 5, where in the sheet is fixed to each of the gas bag sections at least one point.

7. The airbag of claim 6, wherein the sheet is fastened nondisplaceably to the gas bag.

8. The airbag of claim 1, wherein the sheet is positioned so that during inflation of the gas bag the sheet is tightened.

9. The airbag of claim 1, wherein the sheet is positioned to brace the gas bag sections relative to each other.

10. The airbag of claim 1, wherein the sheet spans the gap so that, in the case of an impact directed toward the front side of the gas bag, the occupant is intercepted by the sheet.

11. The airbag of claim 10, wherein the occupant is intercepted by a region of the sheet overlying the gap.

12. The airbag of claim 11, wherein a region of the sheet-like element has no direct contact with the gas bag.

13. The airbag of claim 1, wherein during inflation of the gas, each gas bag section unfolds in a direction pointing next to the upper body of the occupant to be protected.

14. The airbag of claim 1, wherein the gap extends essentially along the longitudinal direction of the upper body of the occupant.

15. The airbag of claim 1, wherein the sheet comprises a membrane.

16. The airbag of claim 1, wherein the sheet comprises a net.

17. The airbag of claim 1, wherein the sheet is fastened to the gas bag by at least one seam which is used for connecting different parts of the gas bag covering.

18. The airbag of claim 1, wherein the gas bag has precisely two gas bag sections separated from each other by means of a gap.

19. The airbag claim 1, wherein the gas bag when inflated is of essentially V-shaped design in cross section.

20. The airbag of claim 1, wherein the gas bag has more than two gas bag sections.

21. The airbag of claim 20, wherein the gas bag sections are arranged in a star-shaped manner.

22. The airbag of claim 1, wherein the gas bag further comprises a further indentation between gas bag sections.

23. The airbag of claim 1, wherein the gas bag is configured and fastened to the vehicle so that the gas bag provides protection for the knees of the occupant.

* * * * *